United States Patent
Fields et al.

(10) Patent No.: US 6,686,955 B1
(45) Date of Patent: Feb. 3, 2004

(54) LIGHTWEIGHT IMAGE MANIPULATION FOR MAXIMIZING THE CAPACITY OF DIGITAL PHOTO STORAGE MEDIA

(75) Inventors: Duane K. Fields, Austin, TX (US); Thomas P. Gregg, Round Rock, TX (US); Sebastian Hassinger, Blanco, TX (US); William W. Hurley, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,498

(22) Filed: Jan. 29, 1999

(51) Int. Cl.⁷ ............................................. H04N 5/225
(52) U.S. Cl. ................. 348/218.1; 382/248; 348/331.2; 348/331.6
(58) Field of Search .................... 348/218.1, 231.2, 348/231.6; 382/248, 249, 250, 284

(56) References Cited

U.S. PATENT DOCUMENTS

| | | | |
|---|---|---|---|
| 5,301,350 A | 4/1994 | Rogan et al. | 395/800 |
| 5,321,816 A | 6/1994 | Rogan et al. | 395/200 |
| 5,367,332 A * | 11/1994 | Kerns et al. | 348/61 |
| 5,381,526 A | 1/1995 | Ellson | 395/164 |
| 5,430,812 A * | 7/1995 | Barnsley et al. | 382/235 |
| 5,440,685 A | 8/1995 | Takiyama et al. | 395/164 |
| 5,508,734 A | 4/1996 | Baker et al. | 348/36 |
| 5,526,198 A | 6/1996 | Dodt et al. | 360/48 |
| 5,537,157 A | 7/1996 | Washino et al. | 348/722 |
| 5,576,765 A | 11/1996 | Cheney et al. | 348/407 |
| 5,825,941 A | 10/1998 | Linford et al. | 382/294 |
| 5,830,065 A | 11/1998 | Sitrick | 463/31 |
| 5,852,673 A | 12/1998 | Young | 385/162 |
| 5,854,658 A | 12/1998 | Uz et al. | 348/419 |
| 5,907,353 A * | 5/1999 | Okauchi | 348/218.1 |
| 6,021,225 A * | 2/2000 | Ishikawa | 382/232 |
| 6,084,633 A * | 7/2000 | Gouhara et al. | 348/231.6 |
| 6,125,201 A * | 9/2000 | Zador | 382/166 |
| 6,178,266 B1 * | 1/2001 | Kondo et al. | 382/239 |
| 6,456,335 B1 * | 9/2002 | Miura et al. | 348/588 |
| 2002/0057849 A1 * | 5/2002 | Senda | 382/284 |

FOREIGN PATENT DOCUMENTS

| | | | |
|---|---|---|---|
| CA | 2143897 | 3/1995 | H04N/7/01 |
| JP | 05/145884 | 6/1993 | H04N/5/91 |
| JP | 6-237431 | 8/1994 | H04N/5/781 |
| JP | 08018799 | 1/1996 | H04N/1/413 |

OTHER PUBLICATIONS

Implementation of a Storage Device using Persistent Spectral Hole–Burning; International Business Machines Technical Disclosure Bulletin; vol. 38, No. 12, Dec. 1995; pp. 321–322.

User Guided Selection or Elimination of Identified Information in Video Sequence; International Business Machines Technical Disclosure Bulletin; vol. 39, No. 08, Aug. 1996; pp. 141–146.

(List continued on next page.)

*Primary Examiner*—Andrew Christensen
*Assistant Examiner*—Eric Wisdahl
(74) *Attorney, Agent, or Firm*—Duke W. Yee; Jeffrey S. LaBaw; Wayne P. Bailey

(57) ABSTRACT

A method of storing image files in digital storage media begins by arranging a given set of image files into a composite image. A transformation may be applied to a given image file prior to being arranged into the composite image. A compression routine is then applied to the composite image, with the result then being stored in the digital storage media. This process reduces the amount of storage that would be otherwise required if the individual files were compressed and stored separately.

8 Claims, 2 Drawing Sheets

OTHER PUBLICATIONS

Digital Processor For Data Compaction and Image Enhancement of Echographical Signals; International Business Machines Technical Disclosure Bulletin; vol. 17, No. 10, Mar. 1975; pp. 3154–3158.

Wheeler, J. et al; Digital Imaging; Desktop Publishing Commentary, vol. 8, No. 8, pp. 10–13, Feb. 1993.

Frey, F. et al; Image Quality Requirements for the Digitization of Photographic Collections; Proceedings of the SPIE—The International Society for Optical Engineering, vol. 2663, pp. 2–7, 1996.

Davies, A.; Digital Imaging: Implications for Photographers, Archivists and Education; Axix vol 3, no 1,, pp. 9–15, 1996.

Denz, C. et al; Volume Holographic Storage Demonstrator Based on Phase–Coded Multiplexing; IEEE Journal of Selected Topics in Quantum Electronics, vol 4, no 5, pp. 832–839, Sep.–Oct. 1998.

* cited by examiner

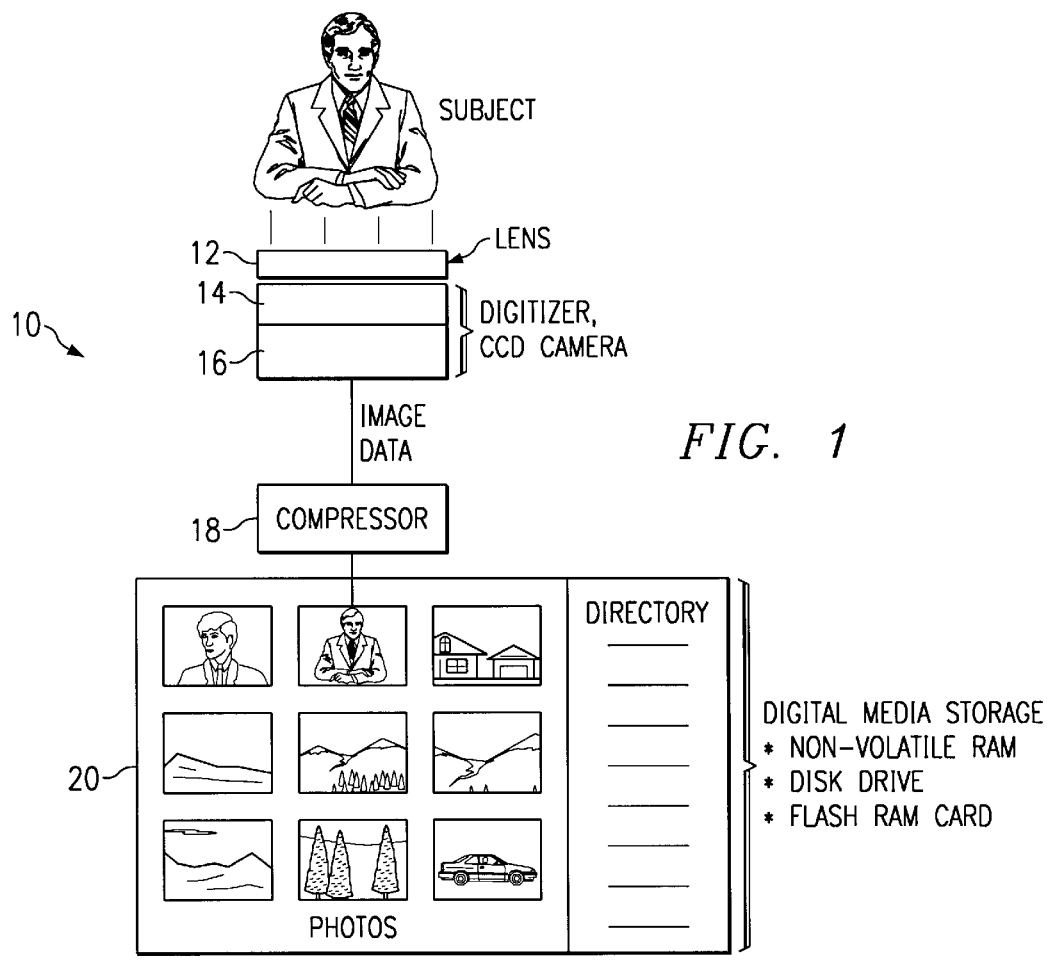
FIG. 1
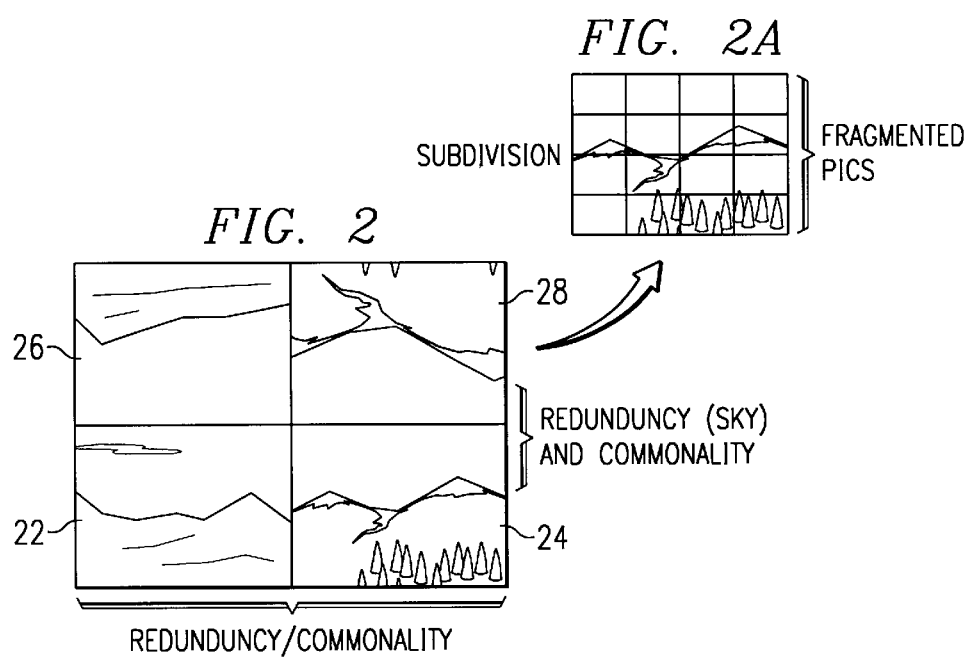
FIG. 2A
FIG. 2

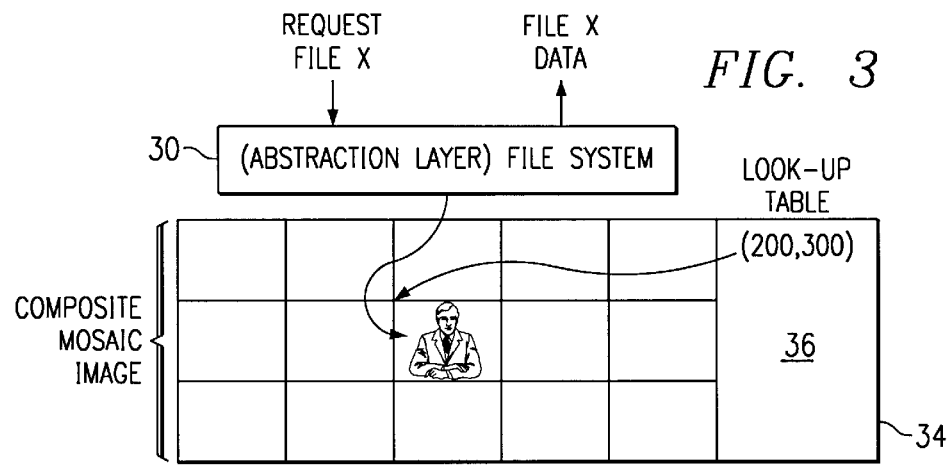
FIG. 3
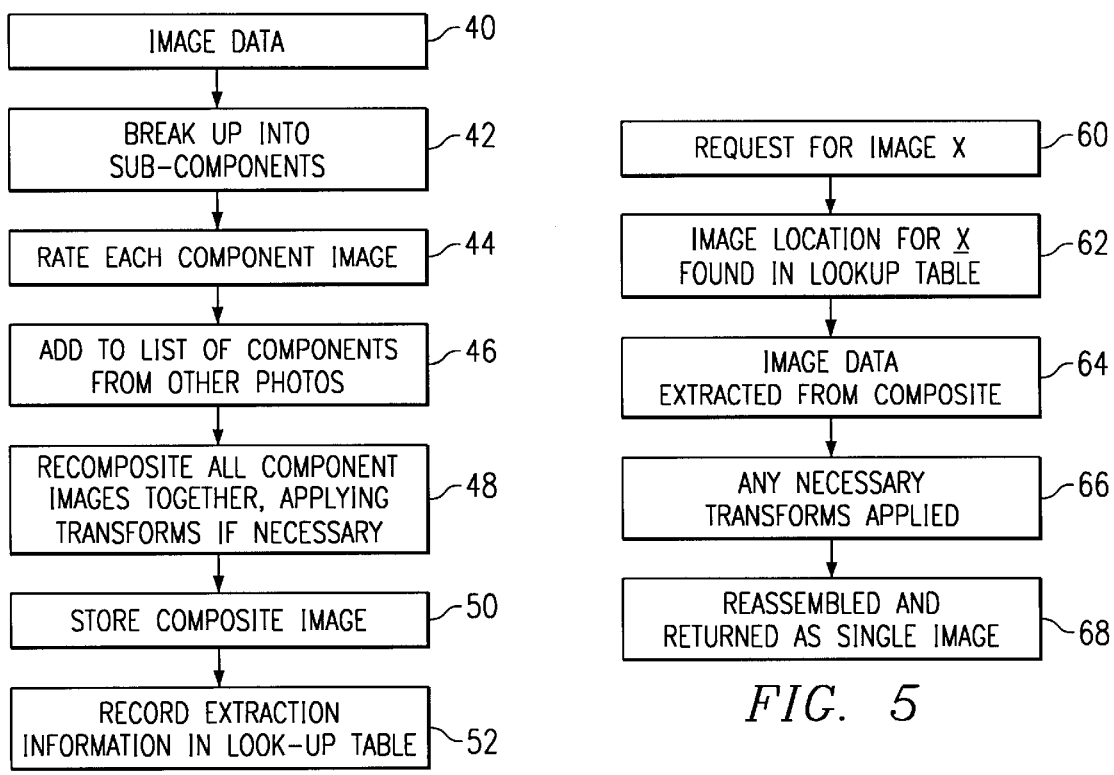
FIG. 4
FIG. 5

LIGHTWEIGHT IMAGE MANIPULATION FOR MAXIMIZING THE CAPACITY OF DIGITAL PHOTO STORAGE MEDIA

BACKGROUND OF THE INVENTION

1. Technical Field

This invention relates generally to digital photo storage media such as exists in a digital camera and, in particular, to methods for more efficient storage of digital content in such media.

2. Description of the Related Art

Recently, the computer industry has sought to add computer processing and communications capabilities to devices other than what would normally be considered a traditional computer. Such devices are quite varied and include, for example, personal digital assistants (PDAs), smartphones, cellular phones, desktop screen phones, in-vehicle devices, business organizers (e.g., IBM WorkPad™, PalmPilot™, and the like), peripherals (such as printers, fax machines, and the like), handheld or palmtop computing devices, and the like. For convenience, these devices, as a class, are referred to herein as "pervasive computing" clients as they are devices that are designed to be connected to servers in a computer network and used for computing purposes regardless of their location.

Digital cameras are now being proposed as pervasive computing devices. The recent increase in the popularity of digital photography has created a need for improved storage schemes in such devices. Because digital cameras must store images in either RAM or removable media, each with a finite capacity, it is desirable to maximize the amount of photos that can be stored in the camera. To this end, most digital cameras use a compression scheme, such as JPEG, to reduce the size of the photos.

While such compression schemes are quite useful, there remains a need to provide enhanced methods for storing digital photos in digital photo storage media. Preferably, such methods would not require special image processing functions or new compression techniques.

The present invention addresses this problem.

BRIEF SUMMARY OF THE INVENTION

It is a primary object of this invention to maximize the capacity of digital photo storage media such as exists in a digital camera.

It is another primary object of this invention to provide a mechanism that uses lightweight image manipulations, such as clipping, inversion, rotation and reflection, to minimize the total space required to store digital pictures on digital storage media, such as disk or RAM cards.

It is a further object of this invention to maximize digital photo storage media capacity without special image processing functions or new compression techniques.

Another object of this invention is to augment existing compression techniques (e.g., JPEG) in digital cameras to provide for improved storage of digital photos.

Still another more general object of this invention is to provide a novel approach to storing a collection of images in a digital camera in a given manner to maximize storage savings with very little overhead.

Another general object is to provide a digital camera having enhanced photo storage capability.

These and other objects are achieved in a digital camera that includes a lightweight image processing mechanism according to the present invention The mechanism divides up each picture stored in the camera, preferably into equal size subcomponents. The subcomponents from a given set of the photos are then "quilted" together, preferably into one large composite image. Preferably, the subcomponents are stitched together in such a way that maximizes the camera's existing compression technique. In particular, given subcomponents are selectively transformed (e.g., clipped, inverted, rotated, reflected, and the like), to position the subcomponents as desired. For example, if the camera uses JPEG compression, two predominately blue subcomponents are placed next to each other as JPEG is a compression technique that exploits color redundancies. After the subcomponents are processed, the coordinates of the sectors are indexed and stored so that an individual image can be reconstructed by clipping out its component subcomponents and reassembling the image. With this processing, the more similar the photos in the set, the more compression benefit is achieved.

Thus, preferably the present invention is implemented in a digital camera having a digital storage media and a compression routine for storing digital photos in a compressed formal in the digital storage media. According to the invention, a set of digital photos are processed into subcomponents, which are then collected into a composite image and then applied to the compression routine. The coordinates of the subcomponents within the composite image are then indexed and stored so that the individual photos can be reconstructed.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a simplified block diagram of a digital photo capture and storage device;

FIG. 2 is a simplified illustration of how a set of individual images are arranged into a composite image according to the present invention;

FIG. 2A is an illustration showing how an individual image is subdivided into sectors to facilitate processing of the composite image;

FIG. 3 is a simplified representation of how the composite image is stored and accessed using a file system of a digital photo capture and storage device;

FIG. 4 is a simplified flowchart of a composite image creation and storage routine; and FIG. 5 is a simplified flowchart of a routine for extracting an individual image from the stored composite image.

DETAILED DESCRIPTION OF THE PREFERRED EMBODIMENT

FIG. 1 illustrates a simplified block diagram of a digital photo capture and storage device 10, e.g., a digital camera.

The device comprises a lens 12, digitizer 14 and charge coupled device (CCD) 16 for capturing image data in a digital format. The image data is typically compressed before storage. To this end, the device 10 includes a compression device 18. In particular, it is well-known that digital cameras include special hardware to handle native compression techniques, for example, an ASIC having JPEG-based compression. JPEG, as is well-known, is a compression technique that takes an image and creates a frequency map of a given color characteristic (e.g., hue, saturation or luminosity). Pixels sharing the characteristic are then represented by a smaller piece of data to reduce storage requirements. Thus, according to known techniques, following compression, the image data is stored in digital storage medium 20, which may be nonvolatile RAM, a disk drive, a floppy drive, a flash RAM card, or the like. The digital storage medium 20 also includes a directory. As can be seen, each compressed image is stored as a separate file. As a result, there is significant overhead required to store a set of such files because each file has file format constraints, e.g., headers and other common structures, that are repeated across each of the individual files.

Typically, many of the separate images in the digital storage medium have features in common. In particular, most photographers tend to frame subjects in the same way, and often many images in a set of photographs have similar backgrounds (e.g., a blue sky). The present invention is based on the recognition that, in the usual case, there is a high probability of redundancy between the various individual photos of the stored set. Accordingly, the present invention provides a mechanism for using such redundancy to maximize storage of such photos, preferably without altering the device's existing compression scheme. This goal is achieved by arranging a number of images into a single composite image or "mosaic" that takes advantage of the existing compression algorithm's strength.

FIG. 2 illustrates the inventive approach. In this example, there are four (4) discrete images 22, 24, 26, and 28, each of which show a rugged mountain landscape and a blue sky. According to the invention, the discrete images are stitched or "quilted" together into a single composite image in such a way as to maximize the value of a given compression routine. Thus, in this example, photo 22 and photo 24 have been placed side-by-side given the redundancies in the mountain images and the commonality in the blue sky. Photos 26 and 28 have each been flipped and then arranged on top of the photos 22 and 24 to increase the shared common areas (namely, the blue sky). Photos 26 and 28 also share the somewhat common mountain range images. As a result of the transformation of individual images and the aggregation as shown, the overall composite image (comprising the set of four photos) has more overall redundancy and commonality. Thus, when the composite image is then compressed, a lesser amount of memory is required (to store the compressed composite image) as compared to the amount of memory that would otherwise be required to store separate compressed versions of each of the four photos.

As is well-known, compression routines such as JPEG exploit commonality, namely, slight variations in color (as opposed to abrupt or drastic changes) or some other image characteristic. JPEG, for example, is based on the fact that humans are much more aware of small changes in brightness (luminance) than small changes in color or large changes in color or brightness. Typically, a JPEG compression starts by converting color data from RGB to a system that identifies the brightness of each pixel. Once the conversion is made, a first data reduction takes place in a process called sub-sampling. The brightness scale is left alone, while half of the other two scales are eliminated by replacing two neighboring pixels with a single value representing their average. This reduces the entire image to two-thirds of its original size with no noticeable loss in quality. The next steps work on 8 by 8 blocks in the image. Using a direct cosine transform (DCT) and quantization, the changes in brightness and color within each block are identified and rounded off. The amount of rounding increases with the size of the change, thus giving more weight to the smaller changes. This produces a set of values that still describes the image data, although not as accurately as before, and contains many identical values because of the rounding process. All identical values are then compressed via a standard lossless compression technique.

The present invention exploits the known property that compression routines exploit commonality by arranging a set of individual images into a composite image that takes better advantage of the compression routine than can the individual photos themselves. The present invention thus provides "lightweight" image processing, because it preferably just augments the device's existing compression functionality. The digital camera does not require any significant new chips or added processing capability to achieve the storage-savings provided by the technique. Stated differently, the invention preferably leverages an underlying type of compression rather than creating a new compression type.

While the present invention has been illustrated in the context of a digital camera, this is not a limitation. The inventive technique is useful in any system or device (preferably at the file system level, as will be seen) in which it is desired to reduce the storage requirements of digital media such as photos. Thus, the invention is useful in any type of pervasive computing client, especially where there are storage constraints and there may not be significant computing power available for new or additional CPU-intensive compression algorithms. More generally, the invention is useful in any photo capture and storage system or device including, without limitation, a digital archive, a laser disk system, a scanner, a digital photo album storage device, and the like.

Referring now to FIG. 3, the invention is preferably implemented as an abstraction at the file system level of the digital storage medium. Thus, the fact that individual photos are compiled into a "mosaic" before compression and storage need not be readily surfaced to the user. If the inventive technique is built into the device, individual photos are aggregated into the composite as they are taken. For an existing device, the invention may be applied as pictures are extracted from the camera and placed in storage. Thus, in the preferred embodiment, as illustrated in FIG. 3, the device's file system 30 stores the composite image 32 in the digital storage medium 34 together with a lookup table 36. Table 36 contains mapping information necessary to extract or reconstruct the individual images.

FIG. 4 is a flowchart describing the preferred process for creating and storing the composite image. FIG. 5 is a flowchart described the preferred routine for reconstructing an individual image. In each case, it is preferred that the control functions are carried out through the existing file system as described above.

Referring now to FIG. 4, the routine begins at step 40 with the processing of an data representing a discrete image to be aggregated into the composite image. If desired, the inventive technique may be performed on an entire image (as illustrated above) or on given components or "sectors" of an image. Subdividing each image into subcomponents or sectors often maximizes redundancies, thereby enhancing the degree of compression achieved by the underlying compression routine. To this end, at step 42, the image is broken into subcomponents (as illustrated in FIG. 2A). The routine then continues at step 44 to "rate" each component of the image being processed according to some given criteria (e.g., hue, saturation, luminosity, content or the like). Preferably, each sector is assigned a number or "rank" based on some given characteristic (e.g., its color and/or content) that is normally exploited by the underlying compression routine. Other factors that may be taken into consideration in generating a ranking may include the picture content, the capability of the processor, the ease or difficulty in reconstructing the sectors, and the like.

The routine continues at step 46 with the sector being added to a list of components generated from the other digital images being aggregated into the composite image. As step 48, the routine composites all component images together, applying transforms to individual components if necessary as has been previously described. At step 50, the composite image is stored. The routine then continues at step 52 by recording extraction information in the lookup table. This completes the composite image creation and storage routine.

The actual algorithm for arranging and ranking the subcomponents of an image are implementation-specific. Thus, an implementation for a camera's images using JPEG preferably is different than a digital archive's images using PNG, for example. In general, however, one illustrative method is as follows. The first step is to identify the key components of the underlying compression algorithm that determine the effectiveness of the compression. A subcomponent may be anything from the whole image to some smaller portion of the image, again depending on the specific characteristics of the compression algorithm, i.e. if JPEG works best on 8 by 8 pixel squares, that would be the size of a segment. Next, the segments of the image are analyzed in terms of hue, luminosity, saturation, or whatever other parameters the specific compression algorithm acts upon. With a composite value representing the general character of the subcomponent, a determination is then made as to the appropriate position of the subcomponent in a larger composite grid. As previously described, subcomponents are preferably located in an area of like segments, as described by calculated values. Then, the size and position of the subcomponent within the grid is recorded so that the subcomponent can be retrieved and viewed at a later time.

As described above, the present invention also provides a means to extract a given image from the composite. Referring now to FIG. 5, a simplified flowchart of an extraction routine is illustrated. The routine begins at step 60 with a request for a given image. At step 62, the image location for the image is found in the lookup table. At step 64, the image data is extracted from the composite image. Prior to step 64, the composite image is decompressed and the routine may crop the composite image to a given area to facilitate processing. The routine then continues at step 66 to apply any necessary transforms. This step may be necessary if a given component of an image was transformed prior to being aggregated into the composite image. At step 68, the image components are reassembled and returned as a single image. This completes the extraction routine processing.

According to the invention, image or image component transforms may be of several different types. As noted above, the particular transforms used are designed to maximize the operation of the underlying compression routine. In an illustrative embodiment, the transforms include: mirroring, cutting, cropping, inverting, flipping, reversing, rotating and color shifting. Inversion renders the negative of the image. One of ordinary skill in the art will appreciate that other transforms, or combinations of such transforms, may be used as well.

As noted above, the present invention may be implemented in any pervasive computing client device. A representative pervasive client is x86-, PowerPC®- or RISC-based, includes a runtime operating system such as WindRiver VXWorks™, QSSL WNX4™, or Microsoft Windows CE, and includes a Web browser.

While the invention has been described in the context of a JPEG-based compression routine, one of ordinary skill will appreciate that this is not a limitation of the invention. Similar advantages are also obtained by applying the invention with other types of compression (e.g., .gif, .png or the like). In particular, other applications use different file formats that contribute to storage overhead when individual files are stored separately. As has been previously described, the present invention substantially reduces this overhead by obviating storage of redundant headers and other data structures as the individual files are aggregated into the composite file.

The inventive functionality of the lightweight image processing routine preferably is implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by letters patent is set forth in the following claims.

What is claimed is:

1. A method of storing digital image files in digital storage media, comprising the steps of:

dividing each of a set of digital image files into subcomponents;

rating the subcomponents;

performing given transformations on selected subcomponents of the image files;

generating a composite image file from the subcomponents based at least partially on the subcomponents' rating;

applying a given compression routine to the composite image file; and storing the composite image file as compressed.

2. The method as described in claim 1 wherein the given transformations are selected from a set of image manipulations.

3. The method as described in claim 1 further including the step of indexing the subcomponents to facilitate reconstruction of each digital image file.

4. The method as described in claim 1 further including the step of:

reconstructing a given digital image file from the composite image file.

5. A method of storing image files in digital storage media, comprising the steps of:
   responsive to a request to store an image file, dividing the image file into subcomponents;
   rating the subcomponents;
   performing given transformations on selected subcomponents of the image file;
   aggregating the subcomponents into a composite image file based at least partially on the subcomponents' rating;
   applying a given compression routine to the composite image file; and
   storing the composite image file as compressed.

6. In a digital camera having a digital storage medium and a compression routine for storing digital photographs in a compressed form in the digital storage medium, the improvement comprising:
   means for dividing each of a set of image files into subcomponents;
   means for rating the subcomponents;
   means for performing given transformations on selected subcomponents of the image files; and
   means for generating a composite image file from the subcomponents based at least partially on the subcomponents' rating;
   wherein the compression routine is applied to the composite image file.

7. A digital camera, comprising:
   a processor;
   a digital storage medium;
   a compression routine;
   a file system; and
   an image manipulation routine, comprising:
      means for dividing each of a set of image files into subcomponents;
      means for rating the subcomponents;
      means for performing given transformations on selected subcomponents of the image files; and
   means for generating a composite image file from the subcomponents based at least partially on the subcomponents' rating;
   wherein the compression routine is applied to the composite image file.

8. The digital camera as described in claim 7 wherein the image manipulation routine further includes means for extracting an image file from the composite image file.

* * * * *